United States Patent
Park et al.

(10) Patent No.: US 9,568,327 B2
(45) Date of Patent: Feb. 14, 2017

(54) NAVIGATION SYSTEM FOR DETERMINING ROUTE CHANGE OF VEHICLE

(75) Inventors: Kwang Il Park, Seoul (KR); Sang Mook Lim, Seoul (KR); Jin Hyuck Kim, Seoul (KR)

(73) Assignee: PLK TECHNOLOGIES, Seoul (KR)

( * ) Notice: Subject to any disclaimer, the term of this patent is extended or adjusted under 35 U.S.C. 154(b) by 81 days.

(21) Appl. No.: 14/417,998

(22) PCT Filed: Sep. 7, 2012

(86) PCT No.: PCT/KR2012/007218
§ 371 (c)(1),
(2), (4) Date: Jan. 28, 2015

(87) PCT Pub. No.: WO2014/027718
PCT Pub. Date: Feb. 20, 2014

(65) Prior Publication Data
US 2015/0241232 A1    Aug. 27, 2015

(30) Foreign Application Priority Data

Aug. 16, 2012    (KR) .................. 10-2012-0089595

(51) Int. Cl.
*G01C 21/34*    (2006.01)
*G06K 9/00*    (2006.01)
(Continued)

(52) U.S. Cl.
CPC .......... *G01C 21/3415* (2013.01); *B60W 30/12* (2013.01); *G01C 21/3602* (2013.01);
(Continued)

(58) Field of Classification Search
CPC ............ G06K 9/00798; G06K 9/00791; G06K 9/6202; G01C 21/3658; G01C 21/3415; G01C 21/3602; G08G 1/167; B60W 30/12; G06T 7/0085
See application file for complete search history.

(56) References Cited

U.S. PATENT DOCUMENTS

| 7,742,872 B2 | 6/2010 | Kimura et al. |
| 8,239,131 B2 * | 8/2012 | Kindo ................... G01C 21/30 701/436 |

(Continued)

FOREIGN PATENT DOCUMENTS

| CN | 102514572 A | 6/2012 |
| JP | 2001-330459 A | 11/2001 |

(Continued)

OTHER PUBLICATIONS

European Search Report dated Jan. 3, 2016.

*Primary Examiner* — Jason Holloway
(74) *Attorney, Agent, or Firm* — Rabin & Berdo, P.C.

(57) ABSTRACT

A navigation system may include: a GPS module; an image recognition module having a line recognition function; a roadmap storage module configured to store roadmap information and route change possible section information through which a route of a vehicle is changed; a roadmap receiving module configured to receive the roadmap information; and an arithmetic processing module configured to determine whether the route of the vehicle is changed, based on the route change possible section information and line recognition information recognized by the image recognition module.

19 Claims, 13 Drawing Sheets

(51) Int. Cl.
  *G01C 21/36* (2006.01)
  *G08G 1/16* (2006.01)
  *G06K 9/62* (2006.01)
  *B60W 30/12* (2006.01)

(52) U.S. Cl.
  CPC ..... *G01C 21/3658* (2013.01); *G06K 9/00798* (2013.01); *G06K 9/6202* (2013.01); *G08G 1/166* (2013.01); *G08G 1/167* (2013.01)

(56) References Cited

U.S. PATENT DOCUMENTS

| | | | |
|---|---|---|---|
| 9,097,545 B1* | 8/2015 | Denise | G01C 21/3415 |
| 2004/0230375 A1* | 11/2004 | Matsumoto | B60T 8/17557 |
| | | | 701/301 |
| 2006/0031008 A1* | 2/2006 | Kimura | G01C 21/3655 |
| | | | 701/437 |
| 2007/0225907 A1 | 9/2007 | Oonishi et al. | |
| 2008/0077322 A1* | 3/2008 | Sumizawa | G01C 21/30 |
| | | | 701/448 |
| 2009/0080704 A1* | 3/2009 | Mori | G08G 1/167 |
| | | | 382/104 |
| 2009/0138193 A1 | 5/2009 | Katou et al. | |
| 2010/0246889 A1* | 9/2010 | Nara | G06K 9/00798 |
| | | | 382/104 |
| 2010/0268452 A1* | 10/2010 | Kindo | G01C 21/30 |
| | | | 701/533 |
| 2010/0284569 A1* | 11/2010 | Sakurai | G06T 3/00 |
| | | | 382/103 |
| 2013/0275033 A1* | 10/2013 | Bastiaensen | G01C 21/26 |
| | | | 701/119 |

FOREIGN PATENT DOCUMENTS

| | | |
|---|---|---|
| JP | 2006-023278 A | 1/2006 |
| JP | 2006-053109 A | 2/2006 |
| KR | 10-2005-0101726 A | 10/2005 |

* cited by examiner

| Line Characteristic Information | | First Lane | | Second Lane | | Third Lane | | Fourth Lane | | Fifth Lane | | |
|---|---|---|---|---|---|---|---|---|---|---|---|---|
| Line Number | | 0 | | 1 | | 2 | | 3 | | 4 | | 5 |
| Double Line | 1 | Yellow | Solid Line | Blue | Solid Line | White | Dotted Line | White | Dotted Line | White | Dotted Line | White | Solid Line |
| | 2 | Yellow | Solid Line | Blue | Solid Line | – | – | – | – | – | – | – | – |
| | 3 | – | – | – | – | – | – | – | – | – | – | – |

Line Recognition Information

| Line Number | | 0 | | 1 | |
|---|---|---|---|---|---|
| Double Line | 1 | Blue | Solid Line | White | Dotted Line |
| | 2 | Blue | Solid Line | – | – |
| | 3 | – | – | – | – |

FIG. 4

Line Recognition Information

| Line Number | | 0 | | 1 | |
|---|---|---|---|---|---|
| Double Line | 1 | Blue | Solid Line | White | Dotted Line |
| | 2 | Blue | Solid Line | – | – |
| | 3 | – | – | – | – |

Exact match (columns 1, 2)

Line Characteristic Information

| Line Number | | 0 | | 1 | | 2 | | 3 | | 4 | | 5 | |
|---|---|---|---|---|---|---|---|---|---|---|---|---|---|
| Double Line | 1 | Yellow | Solid Line | Blue | Solid Line | White | Dotted Line | White | Dotted Line | White | Dotted Line | White | Solid Line |
| | 2 | Yellow | Solid Line | Blue | Solid Line | – | – | – | – | – | – | – | – |
| | 3 | – | – | – | – | – | – | – | – | – | – | – | – |

FIG. 5

Line Recognition Information

| Line Number | | 0 | | 1 | |
|---|---|---|---|---|---|
| Double Line | 1 | Blue | Solid Line | White | Dotted Line |
| | 2 | – | – | – | – |
| | 3 | – | – | – | – |

Partial match (column 0) — Exact match (column 1)

Line Characteristic Information

| Line Number | | 0 | | 1 | | 2 | | 3 | | 4 | | 5 | |
|---|---|---|---|---|---|---|---|---|---|---|---|---|---|
| Double Line | 1 | Yellow | Solid Line | Blue | Solid Line | White | Dotted Line | White | Dotted Line | White | Dotted Line | White | Solid Line |
| | 2 | Yellow | Solid Line | Blue | Solid Line | – | – | – | – | – | – | – | – |
| | 3 | – | – | – | – | – | – | – | – | – | – | – | – |

FIG. 6

Line Recognition Information

| Line Number | | 0 | | 1 | | 2 | | 3 | |
|---|---|---|---|---|---|---|---|---|---|
| Double Line | 1 | Yellow | Solid Line | Blue | Solid Line | White | Dotted Line | White | Dotted Line |
| | 2 | – | – | – | – | – | – | – | – |
| | 3 | – | – | – | – | – | – | – | – |

| | Partial match | Partial match | Exact match | Exact match |

Line Characteristic Information

| Line Number | | 0 | | 1 | | 2 | | 3 | | 4 | | 5 | |
|---|---|---|---|---|---|---|---|---|---|---|---|---|---|
| Double Line | 1 | Yellow | Solid Line | Blue | Solid Line | White | Dotted Line | White | Dotted Line | White | Dotted Line | White | Solid Line |
| | 2 | Yellow | Solid Line | Blue | Solid Line | – | – | – | – | – | – | – | – |
| | 3 | – | – | – | – | – | – | – | – | – | – | – | – |

FIG. 7

Line Recognition Information

| Line Number | | 0 | | 1 | |
|---|---|---|---|---|---|
| Double Line | 1 | White | Dotted Line | White | Dotted Line |
| | 2 | – | – | – | – |
| | 3 | – | – | – | – |

| Line Number | | 0 | | 1 | |
|---|---|---|---|---|---|
| Double Line | 1 | White | Dotted Line | White | Dotted Line |
| | 2 | – | – | – | – |
| | 3 | – | – | – | – |

Line Characteristic Information

| Line Number | | 0 | | 1 | | 2 | | 3 | | 4 | | 5 | |
|---|---|---|---|---|---|---|---|---|---|---|---|---|---|
| Double Line | 1 | Yellow | Solid Line | Blue | Solid Line | White | Dotted Line | White | Dotted Line | White | Dotted Line | White | Solid Line |
| | 2 | Yellow | Solid Line | Blue | Solid Line | – | – | – | – | – | – | – | – |
| | 3 | – | – | – | – | – | – | – | – | – | – | – | – |

FIG. 8

| Line Number | 0 | 1 | 2 | 3 | 4 | 5 |
|---|---|---|---|---|---|---|
| Lane Width | – | 3.5m | 2.5m | 2.7m | 3.3m | 2.8m |
| Double Line 1 | Yellow Solid Line | Blue Solid Line | White Dotted Line | White Dotted Line | White Dotted Line | White Solid Line |
| Double Line 2 | Yellow Solid Line | Blue Solid Line | – | – | – | – |
| Double Line 3 | – | – | – | – | – | – |

NAVIGATION SYSTEM FOR DETERMINING ROUTE CHANGE OF VEHICLE

BACKGROUND

1. Technical Field

The present disclosure relates to a supporting technology for safe operation of a vehicle, and more particularly, to a navigation system for determining a route change of a vehicle using image recognition information.

2. Related Art

Recently, much research has been conducted on the technology for safe operation of vehicle drivers. That is, an electronic device such as a navigation system guides a driver to a destination using GPS (Global Positioning System) position information and various sensors based on roadmap information during operation of a vehicle, or re-searches the destination and guides the driver to the re-searched destination when the vehicle deviates from the route to the destination.

However, since conventional GPS devices have a position precision of 20 to 30 m, the conventional GPS devices cannot accurately recognize a driving lane. Thus, even though the driver deviates from the route to the destination, the conventional GPS devices cannot immediately inform the driver that the driver deviated from the route. Thus, when the driver selects a wrong route and deviates from the route to the destination, the driver must return after passing a considerable distance or take another route.

On the other hand, a DGPS (Differential Global Positioning System) device which has been recently developed has a position precision of 1 m or less. Since general roads have a width of 3 to 5 m, lane information recognized by the DGPS device may be used to inform a driver of a route deviation.

However, the DGPS is a very expensive device. Thus, when the DGPS is mounted, the price of the vehicle rapidly increases. That is, an autonomous traveling system using the DGPS has a fundamental limit in being mounted on a vehicle.

SUMMARY

Various embodiments are directed to a navigation system which is capable of extracting high-precision position information like a DGPS device, while using a low-precision GPS device, thereby determining a change in travel route of a vehicle.

Also, various embodiments are directed to a navigation system which is capable of determining a change in travel route of a vehicle using line information, image recognition information, and information for each section, which are interconnected to a GPS device.

In an embodiment, a navigation system may include: a GPS module; an image recognition module having a line recognition function; a roadmap storage module configured to store roadmap information and route change possible section information through which a route of a vehicle is changed; a roadmap receiving module configured to receive the roadmap information; and an arithmetic processing module configured to determine whether the route of the vehicle is changed, based on the route change possible section information and line recognition information recognized by the image recognition module.

The roadmap information stored in the roadmap storage module may include line characteristic information, the arithmetic processing module may include an information matching unit configured to calculate a driving lane by matching the line recognition information with the line characteristic information, and the information matching unit may determine whether the vehicle tries to change the route, through line offset analysis.

Furthermore, the roadmap information stored in the roadmap storage module may include line characteristic information, the arithmetic processing module may include: an information matching unit configured to calculate a driving lane by matching the line recognition information with the line characteristic information; and a line change tracking unit configured to calculate a driving lane by tracking a line change history of the vehicle, and the line change tracking unit may determine whether the vehicle tries to change the route, through line change tracking.

Furthermore, the roadmap information stored in the roadmap storage module may include line characteristic information, the arithmetic processing module may include an information matching unit configured to calculate a driving lane by matching the line recognition information with the line characteristic information, and the information matching unit may determine whether a line change for route change is performed, through line offset analysis.

Furthermore, the roadmap information stored in the roadmap storage module may include line characteristic information, the arithmetic processing module may include: an information matching unit configured to calculate a driving lane by matching the line recognition information with the line characteristic information; and a line change tracking unit configured to calculate a driving lane by tracking a line change history of the vehicle, and the line change tracking unit may determine whether a line change for route change is performed, through line change tracking.

Furthermore, the roadmap information stored in the roadmap storage module may include line characteristic information, the arithmetic processing module may include an information matching unit configured to calculate a driving lane by matching the line recognition information and the line characteristic information, and the information matching unit may determine that a line change for route change was decided, through line offset analysis.

The arithmetic processing module may include: an information matching unit configured to calculate a driving lane by matching the line recognition information with the line characteristic information; and a line change tracking unit configured to calculate a driving lane by tracking a line change history of the vehicle, and the line change tracking unit may determine that a line change for route change was decided, through line change tracking.

Furthermore, the roadmap information stored in the roadmap storage module may include line characteristic information. When the traveling velocity of the vehicle exceeds a predetermined value in comparison to the number of lanes which are to be changed from the current lane of the vehicle, the arithmetic processing module may cancel the current route guide function and search for a next route.

Furthermore, the roadmap information stored in the roadmap storage module may include line characteristic information. When determining that a route change is dangerous because the number of lanes which are to be changed from the current lane of the vehicle is large in comparison to a remaining forward distance to a route change impossible section from the vehicle, the arithmetic processing module may cancel the current route guide function and search for a next route.

When a left line offset acquired through the image recognition module is constantly maintained or decreases and a right line offset acquired through the image recognition module increases, the arithmetic processing module may determine that the vehicle will travel along a route connected to the left line.

When a left line offset acquired through the image recognition module is constantly maintained or decreases and a right line disappears from an image acquired through the image recognition module, the arithmetic processing module may determine that the vehicle will travel along a route connected to the left line.

When a right line offset acquired through the image recognition module is constantly maintained or decreases and a left line offset acquired through the image recognition module increases, the arithmetic processing module may determine that the vehicle will travel along a route connected to the right line.

When a right line offset acquired through the image recognition module is constantly maintained or decreases and a left line disappears from an image acquired through the image recognition module, the arithmetic processing module may determine that the vehicle will travel along a route connected to the right line.

The roadmap information stored in the roadmap storage module may include line characteristic information, the arithmetic processing module may include an information matching unit configured to calculate a driving lane by matching the line recognition information with the line characteristic information, and the information matching unit may perform a route change trial process of determining that the vehicle is trying to change the route, when an offset of a route-change line, acquired through the image recognition module, decreases at a predetermined rate or more in accordance with time, or a route change progress process of determining that a line change for route change is being performed, when the image recognition module recognizes that a part of the vehicle is positioned on the route-change line. At the route change trail process or the route change progress process, a mention may be provided to guide a driver of the vehicle to modify the route.

The arithmetic processing module may further include a lateral position correction unit configured to correct a lateral position by calculating an offset for a left line of the current driving lane from the image recognition information.

The lateral position correction unit may correct the lateral position by adding the offset and the sum of widths of left lanes included in the line characteristic information.

The arithmetic processing module may further include a longitudinal position estimation unit configured to estimate a longitudinal position by calculating a head angle between a line and the traveling direction of the vehicle from the image recognition information, when a received signal of a GPS module is cut off.

BRIEF DESCRIPTION OF THE DRAWINGS

FIG. 4 is a line recognition information table according to the embodiment of the present invention FIGS. 5 to 8 are diagrams illustrating examples in which a driving lane is calculated according to the embodiment of the present invention.

DETAILED DESCRIPTION

Figure 1:
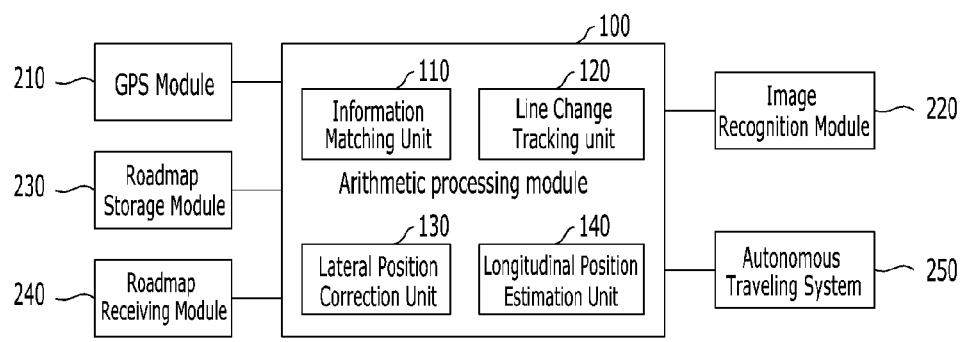
FIG. 1 is a block diagram of a GPS correction system according to an embodiment of the present invention.

Exemplary embodiments will be described below in more detail with reference to the accompanying drawings. However, it should be understood that the present invention is not limited to specific embodiments, but includes all modifications, equivalents, and substitutes included in the scope of the present invention.

Throughout the disclosure, like reference numerals refer to like parts throughout the various figures and embodiments of the disclosure. Furthermore, the drawings are provided for convenience of descriptions, and the shapes and relative dimensions thereof may be exaggerated or omitted.

When the embodiments are described in detail, duplicated descriptions or descriptions for techniques which are obvious to those skilled in the art are omitted herein. Furthermore, when it is described that one element "comprises or includes" another element, it should be understood that the former element may comprise or include only the latter element, or the former element may comprise or include other elements as well as the latter element as long as there is no specific limitation.

Furthermore, the terms such as "~unit", "~er", and "~module" represent a unit for processing one or more functions or operations, and they may be implemented in hardware, software, or a combination of hardware and software. Furthermore, when one element is referred to as being connected to another element, it should be understood that the former element can be directly connected to the latter element, or connected to the latter element via an intervening element.

Terms such as 'line', 'lane', and 'route', which are used in this specification, may be defined as follows.

A line may indicate a solid line or dotted line drawn at both sides of a lane on which a vehicle travels, a lane may indicate a road on which a vehicle travels between both lines, and a route may indicates a group of one or more lanes through which a vehicle can reach the same destination from a starting place even though the vehicle travels along any lane within the route. That is, a vehicle can reach the same destination from a stating point using one or more routes.

FIG. 1 is a block diagram of a GPS correction system according to an embodiment of the present invention. Referring to FIG. 1, the GPS correction system using image recognition information according to the embodiment of the present invention may include a GPS module 210 and an arithmetic processing module 100. The GPS module 210 may be mounted on a vehicle, and the arithmetic processing module 100 may calculate current driving lane information of a vehicle, while communicating with an image recognition module 220. Furthermore, according to another embodiment of the present invention, the GPS correction system may selectively include a roadmap storage module 230 which stores roadmap information containing line characteristic information or a roadmap receiving module 240 which receives such roadmap information. Furthermore, according to another embodiment of the present invention, the GPS correction system may include both of the roadmap storage module 230 and the roadmap receiving module 240.

The roadmap storage module 230 may include one or more storage media of a flash memory, a hard disk-type memory, a multimedia card micro-type memory, a card type memory such as SD or XD memory, RAM (Random Access Memory), SRAM (Static Random Access Memory), ROM (Read Only Memory), EEPROM (Electrically Erasable Programmable Read Only Memory), PROM (Programmable Read Only Memory), a magnetic memory, a magnetic disk, and an optical disk.

FIG. 1 illustrates the arithmetic processing module 100 and the image recognition module 220 as separate modules. However, the two modules do not need to be physically separated from each other. For example, the image recognition module 220 within the navigation system may include the arithmetic processing module 100, or the image recognition module 220 and the arithmetic processing module 100 may be provided together in an autonomous traveling system 250. The two modules may be implemented as one processor, and separated from each other in a software manner. Alternatively, the executive routines of the two modules may be divided and performed. That is, the arithmetic processing module 100, the image recognition module 220, and other components are divided in terms of functions, but implemented on the same hardware.

The GPS module 210 according to the embodiment of the present invention may not require high precision. The arithmetic processing module 100 according to the embodiment of the present invention may correct position information acquired from the GPS module 210 which is provided at a low price, using image recognition information, thereby converting the position information into information with high precision. The GPS module 210 may acquire position data through a GNSS (Global Navigation Satellite System). The GNSS indicates a navigation system which can calculate the position of a receiver terminal using a radio signal received from a satellite. Specific examples of the GNSS may include GPS (Global Positioning System), Galileo, GLONASS (Global Orbiting Navigational Satellite System), COMPASS, IRNSS (Indian Regional Navigational Satellite System), and QZSS (Quasi-Zenith Satellite System), depending on the operating bodies thereof.

The arithmetic processing module 100 may calculate driving lane information and transmit high-precision position information to the autonomous traveling system 250. The communication between devices according to the embodiment of the present invention may be performed through a CAN (Car Area Network). Furthermore, communication between devices according to another embodiment of the present invention may be performed through near-field wireless communication such as Bluetooth, RFID (Radio Frequency Identification), infrared data association, UWB (Ultra Wide-Band), or ZigBee.

The arithmetic processing module 100 may include one or more processors. Referring to FIG. 1, the arithmetic processing module 100 may include an information matching unit 110, a line change tracking unit 120, a lateral position correction unit 130, and a longitudinal position estimation unit 140. Each of the units may be implemented as an independent processor within the arithmetic processing module 100 or form a sub-routine programmed within one processor. Furthermore, a part of the units may be selectively used.

Hereafter, while embodiments of the respective units of the arithmetic processing module 100 are described, a navigation system for determining a route change of a vehicle and a method thereof according to an embodiment of the present invention will be described in detail.

Figure 2A:
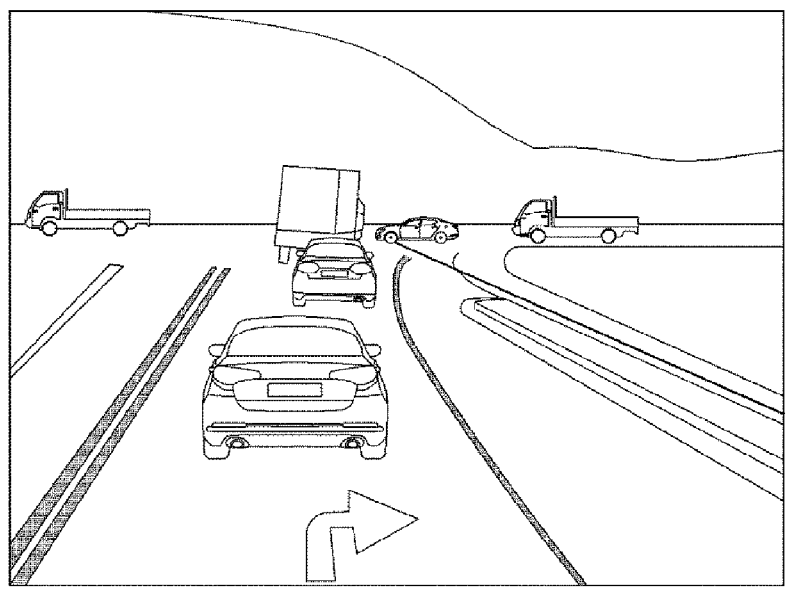
FIGS. 2A and 2B are images taken by an image recognition module.
Figures 2B, 3:
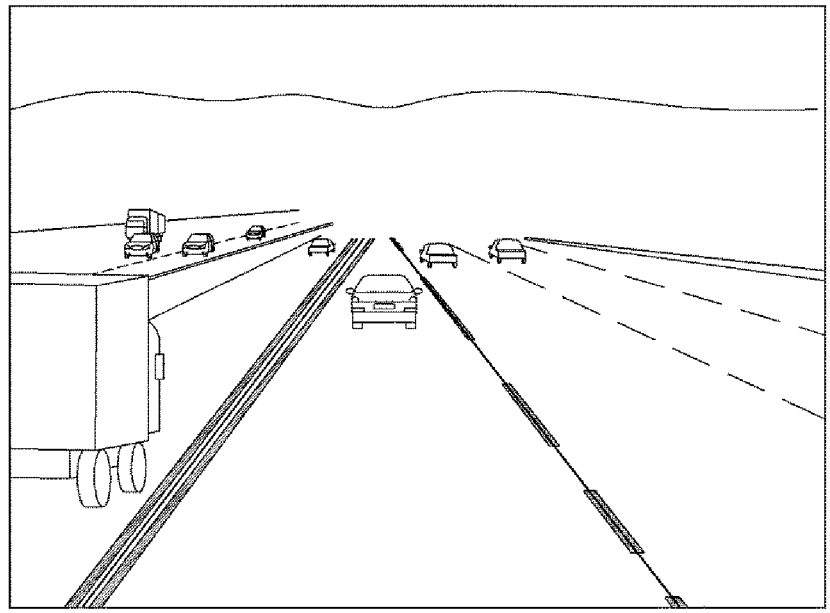
FIG. 3 is a line characteristic information table according to the embodiment of the present invention.

FIGS. 2A and 2B are images taken by a camera mounted on a vehicle during actual operation of the vehicle. FIG. 2A is a photograph of a two-lane national highway, and FIG. 2B is a photograph of a four-lane expressway. In FIG. 2A, the left line of a driving lane of the vehicle is a double yellow solid line indicating the center line, and the right line thereof is a white solid line. In FIG. 2B, the left line of a driving lane is a double blue solid line indicating a bus-only lane, and the right line thereof is a white dotted line. As such, each of lines may represent various pieces of information depending on the position of a lane.

However, when a large number of lines exist on the road, most of the lines are represented by white lines. In some cases, a bus-only lane may be positioned at the first right lane instead of the first left lane. Thus, a driving lane cannot be accurately recognized only by analyzing an image taken by the camera through the image recognition module 220.

In the present embodiment, the arithmetic processing module 100 may basically calculate a driving lane by matching line recognition information acquired through the image recognition module 220 with roadmap information. For example, the roadmap information may be stored in the roadmap storage module 230. For another example, the roadmap receiving module 240 may communicate with an external device, and receive roadmap information.

The roadmap information according to the embodiment of the present invention may include roadmap information provided from an electronic device. Furthermore, roadmap information according to another embodiment of the present invention may include dedicated roadmap information provided for GPS correction. The roadmap information may include line characteristic information illustrated in FIG. 3. The line characteristic information may indicate information on a line corresponding to a current position measured through the GPS module 210. Referring to FIG. 3, the line characteristic information may include whether the line is a double line, the color information of the line, and the shape information of the line (for example, solid line or dotted line).

FIG. 3 is a line characteristic information table according to an embodiment of the present invention. In FIG. 3, '0' is a double yellow solid line indicating the center line, and a first line is a double blue solid line indicating a bus-only lane. Between the center line and the first line, a first lane is formed. Second to fourth lines are white dotted lines, and a fifth line is a white solid line.

When the image recognition module 220 recognizes only both lines, line recognition information may be obtained as illustrated in FIG. 4. In FIG. 4, a line number '0' indicates the left line, and a line number '1' indicates the right line. In the example of FIG. 4, the left line is a double blue solid line, and the right line is a white dotted line.

FIG. 5 illustrates that the information matching unit 110 of the arithmetic processing module 100 matches line recognition information recognized by the image recognition module 220 with line characteristic information. As illustrated in FIG. 5, line numbers 0 and 1 of the line recognition information are exactly matched only with line numbers 1 and 2 of the line characteristic information. Thus, the information matching unit 110 may determine that the current driving lane is the second lane. In general, although the low-precision GPS module 210 cannot accurately recognize a driving lane, the current driving lane of the vehicle can be accurately calculated through such information matching.

FIG. 6 illustrates an example in which a driving lane can be calculated even when line recognition information and line characteristic information are partially matched with each other. For example, in the line information recognized by the image recognition module 220, a double line is likely to be recognized as a single line. In this case, the line recognition information illustrated in FIG. 6 may indicate that the left line is recognized as a single blue solid line and the right line is recognized as a white dotted line.

The information matching unit 110 may perform information matching as illustrated in FIG. 6. The left line is partially matched with the first line of the line characteristic information, but the right line is exactly matched with the second line. The left and right lines of the line recognition information are not matched with other lines. That is, the line recognition information is matched only with the case in which the left line is the first line and the right line is the second line. Thus, even in this case, the information matching unit 110 may determine that the current driving lane is the second lane.

FIG. 7 illustrates another example in which line recognition information and line characteristic information are partially matched with each other. As illustrated in FIG. 7, the line recognition information may include information on four lines. For example, the image recognition module 220 may recognize information on other lines as well as information on both lines of a current driving lane. Furthermore, the case in which a double line is not exactly recognized as illustrated in FIG. 6 may occur together.

The information matching unit 110 may perform information matching as illustrated in FIG. 7. As illustrated in FIG. 7, a part of the four-line information of the line recognition information is partially matched with the line characteristic information, and the other part of the four-line information of the line recognition information is exactly matched with the line characteristic information. However, the four-line information of the line recognition information is matched only with line characteristic information ranging from the center line to the third line. Even in this case, the line recognition information and the line characteristic information may be matched to exactly calculate a driving lane.

As illustrated in FIG. 8, however, line recognition information and line characteristic may be exactly matched with each other in several cases. When both of the left line information and the right line information of the line recognition information indicate white dotted lines, the left line information and the right line information may be exactly matched with the second and third lines or the third and fourth lined, during the matching operation with the line characteristic information. In this case, the driving lane cannot be completely calculated only by the information matching unit 110.

The line change tracking unit 120 of FIG. 1 may track the most recent information matching result. For example, when the most recent information matching result indicates that the driving lane was calculated in a state where the driving lane was determined to be the second lane, a line change history may be examined. Since the line change history can be checked by the image recognition module 220, a line change time may be substituted to trace the driving lane.

For example, suppose that one line change has been recently performed and the recent information matching result indicates that the driving lane is the second lane, in a state where the information matching result illustrated in FIG. 8 is obtained. In this case, the current driving lane of the vehicle may be determined to be the third lane. For another example, in a state where the recent information matching result indicates that the driving lane is the second lane, 1 may be added to the driving lane when the driving lane is changed to the right lane, or 1 may be subtracted from the driving lane when the driving lane is changed to the left lane. In this way, the driving lane may be tracked and calculated until the next driving lane is determined.

As described above, when the GPS information is corrected using the information matching unit 110 and the line change tracking unit 120, the current position of the vehicle may be estimated within the driving lane. Since typical roads have a width of 3 m or less, precise position estimation can be performed with few errors.

Furthermore, the navigation system for determining a route change of a vehicle and the method thereof according to the embodiment of the present invention may calculate more precise position information using the lateral position correction unit 130 and the longitudinal position estimation unit 140 which are illustrated in FIG. 1.

Figure 9:
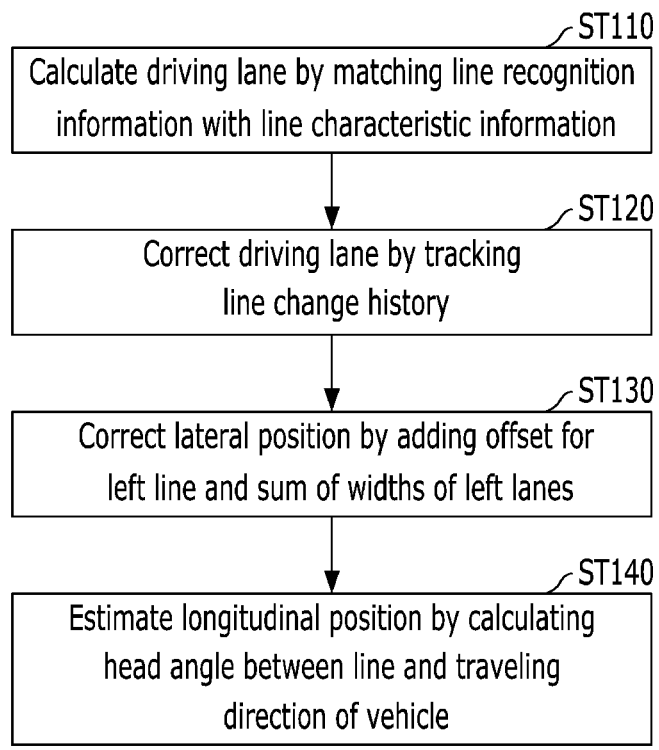
FIG. 9 is a flowchart of GPS correction according to an embodiment of the present invention.

FIG. 9 is a flowchart of GPS correction according to an embodiment of the present invention. Referring to FIG. 9, the arithmetic processing module 100 may calculate a driving lane by matching line recognition information acquired through the image recognition module 220 with lane characteristic information of roadmap information, at step ST110. Various examples in which the information matching unit 110 calculates a driving lane have been already described above.

When a driving lane is not specified at step ST110, the line change tracking unit 120 may correct the driving lane by tracking a line change history of a vehicle, at step ST120.

Figures 10, 11:
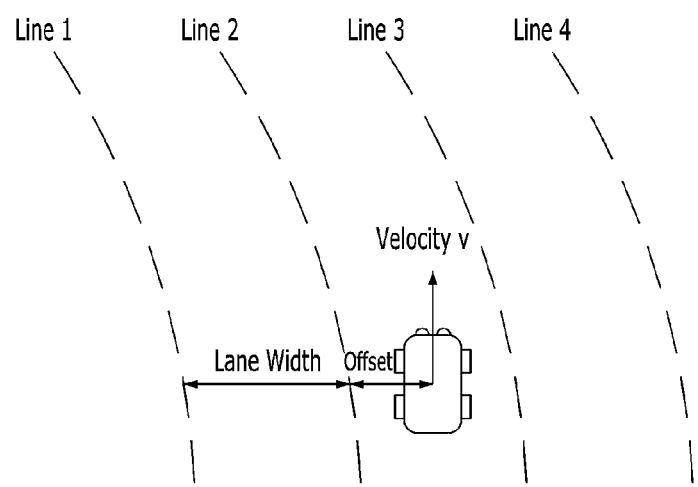
FIG. 10 is a lane width information table according to the embodiment of the present invention.
FIG. 11 is a diagram illustrating an example of lateral position correction according to the embodiment of the present invention.
Figure 12:
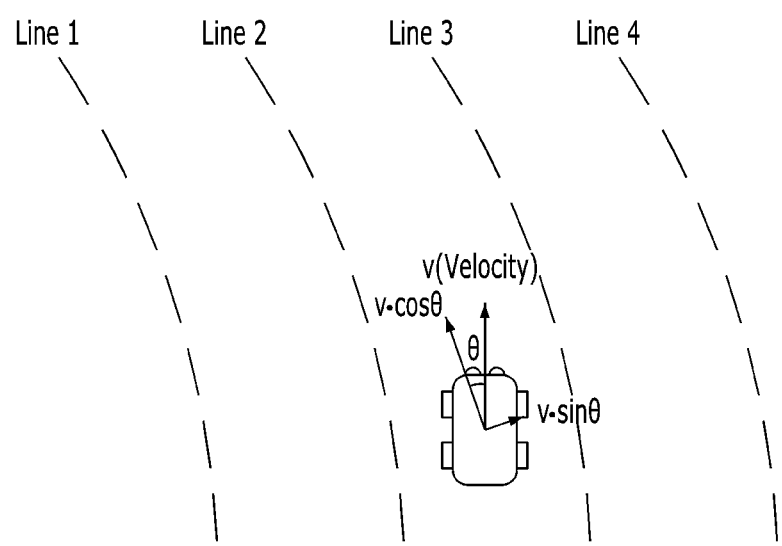
FIG. 12 is a diagram illustrating an example of longitudinal position estimation according to the embodiment of the present invention.

In the present embodiment, an offset for a left line may be calculated to correct a lateral position, in order to obtain more precise position information, at step ST130. As illustrated in FIG. 10, the line characteristic information may include width information on each lane. When it is determined at step ST110 or ST120 that the driving lane is the second lane, the width from the center line to the left line of the driving lane can be obtained from the sum of road widths from the center line to the second lane. In FIG. 10, the sum of road widths from the center line to the left line of the driving lane is 6 m.

The distance between the left line and the vehicle may be obtained from the image recognition module 220. Typically, a specific point on the road may be projected onto one point of an image through a camera conversion equation. The camera conversion equation may be set according to a coordinate conversion model and correction model of the camera, a focal distance of a lens, the installation height of the camera, and the installation angle of the camera. When a camera inverse conversion equation is used in the line recognized through the image, an offset between the line and the vehicle may be obtained.

One example of a simplified camera conversion equation may be expressed as follows.

$$x = -\lambda \frac{X}{Z\cos\Phi} \approx -\lambda \frac{X}{Z + h\Phi} \quad \text{[Equation 1]}$$

$$x = -\lambda \frac{Z\sin\Phi - h\cos\Phi}{Z\sin\Phi + h\cos\Phi} \approx -\lambda \frac{Z\Phi - h}{Z + h\Phi} \quad \text{[Equation 2]}$$

Here, x and y represent coordinate values on the screen, X and Z represent coordinate values on the road, $\lambda$ represents the focal distance of the lens, $\Phi$ represents the installation angle of the camera, and h represents the installation height of the camera.

As illustrated in FIG. 11, the lateral position correction unit 130 may correct the lateral position by adding the sum of road widths of the left lanes of the current driving lane and the offset obtained through the above-describe equations, thereby obtaining a high-precision lateral position with a smaller error than simple driving lane information. As the offset of the driving lane is used to correct the lateral position, the error may be reduced to several tens of cm or less.

Referring to FIG. 9, a head angle formed between the line and the traveling direction of the vehicle may be calculated to estimate a longitudinal position, at step ST140. The longitudinal position refers to a displacement on the roadmap in the line direction. The navigation system may perform a geographic guide according to a longitudinal position. In a place, such as a tunnel, where reception of the GPS module 110 is cut off, a longitudinal position needs to be estimated.

The conventional method was based on the supposition that the velocity at the moment where the GPS reception is cut off is constantly maintained. In this method, however, when traffic congestion occurs in the tunnel, an error may occur in the position estimation. In another method, a displacement may be corrected using an inertia sensor, an acceleration sensor, or a gyro sensor. In this case, since the estimated displacement is an absolute displacement, it is difficult to measure the relation with a lane on the roadmap.

In the present embodiment, image recognition information may be used to estimate a longitudinal position. The longitudinal position estimation unit 140 may calculate a head angle between a line and the traveling direction of the vehicle through image recognition of the previous page, as soon as GPS reception is cut off. Then, vehicle velocity information may be acquired from an ECU or velocity sensor of the vehicle. The distance which the vehicle travels in the line direction during a measurement period may be obtained through Equation 3 below. At this time, the moving direction coincides with the normal direction of the line on the roadmap. Thus, the moving direction of the vehicle in a curved place changes at each moment.

$$LP = \Delta t \times v \times \cos\theta \quad \text{[Equation 3]}$$

Here, LP represents the longitudinal position of the vehicle, $\Delta t$ represents a time change, v represents the velocity of the vehicle, and $\theta$ represents the head angle between the line and the traveling direction of the vehicle.

When the value of Equation 3 is accumulated during a predetermined time (for example, a time from when GPS reception is cut off to when the GPS reception is recovered), the distance which the vehicle has moved along the longitudinal direction of the line can be obtained. In this way, the longitudinal position can be estimated.

Figure 13:
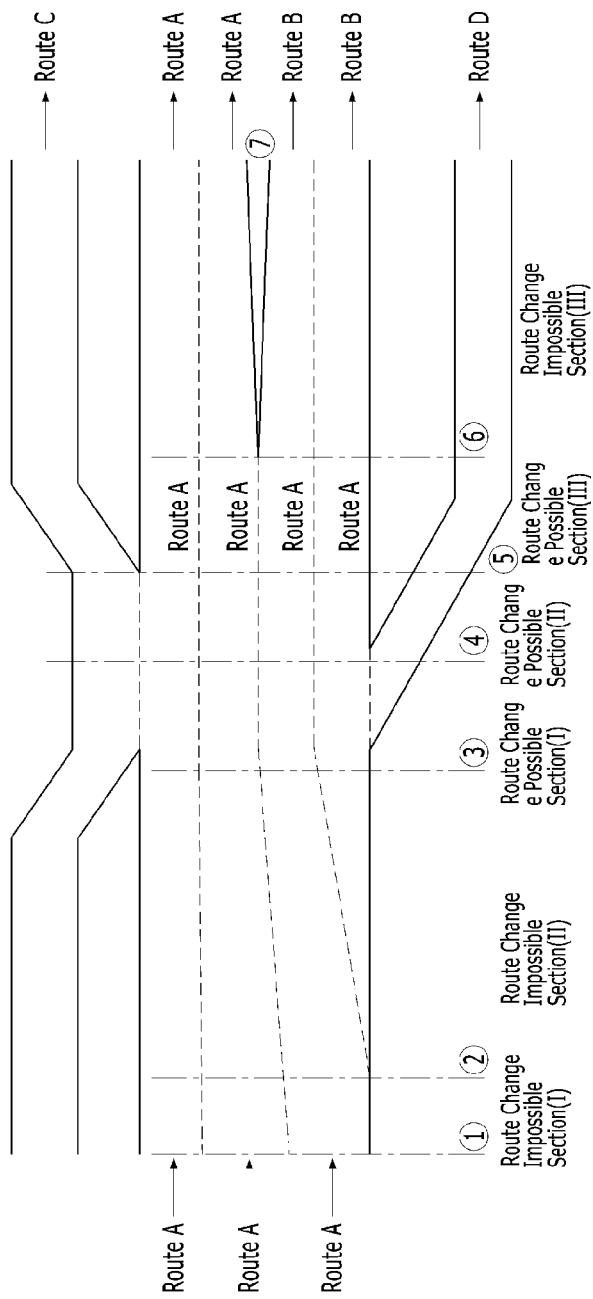
FIG. 13 is a diagram illustrating whether a route change is possible for each section on the road according to an embodiment of the present invention.

FIG. 13 is a diagram illustrating whether a route change is possible for each section on the road according to an embodiment of the present invention.

In the present embodiment, a route may be divided into 'route change impossible section' and 'route change possible section', and stored in the roadmap storage module 230. The route change impossible section may refer to a section in which a vehicle cannot move to another route from the current route through a line change, until the vehicle escapes from the section, and the route change possible section may refer to a section in which a vehicle can move to another route from the current route through a line change, before escaping from the section. When a route change is not performed within a predetermined section, the section does not correspond to the route change possible section.

A route change possible section may be connected to a route change impossible section or another route change possible section, before or after the route change possible section. Route change possible sections may be successively connected to each other. Typically, one or more routes after a vehicle passes through a route change possible section may be referred to as the same name as a route before the vehicle passes through the route change possible section Furthermore, a new lane may be formed or disappear within a route. For example, although a new lane is connected to a lane which can be changed to another route afterwards as in a change impossible section II, the new lane does not need to be considered until the change to another route becomes clear. In this case, the section may be subdivided to reflect the addition of the lane into the line information when the vehicle enters the next section from the previous section.

Referring to FIG. 13, the route change possible section according to the embodiment of the present invention may be set in the following cases:
  the current route encounters another existing route (route C)
  a new route is generated from the current route (route D), and
  the current route is separated (route B).

A route which joins the current route does not need to be considered because a route change to the route is impossible as long as the vehicle does not drive the wrong way.

Furthermore, the route change in FIG. 13 may be divided into the following cases:
  a vehicle changes a route by changing from the leftmost lane to a left lane in a route A within a route change possible section (route A→route C),
  a vehicle changes a route by changing from the rightmost lane to a right lane in a route A within a route change possible section (route A→route D),
  a vehicle changes a route by changing from one lane to a right lane in a route A within a route change possible section (route A of second lane→route B of first lane), and
  a vehicle changes a route by going straight without changing from one lane to another lane in a route A of a route change possible section (route A of third lane→route B of first lane).

On the other hand, route maintenance may be divided into the following cases:

a vehicle travels without changing from one route to another route in a route A of a route change possible section (route A of second lane→route A of second lane), and a vehicle travels by changing from one lane to another lane in a route A of a route change possible section (route A of third lane→route A of second lane). This case may include a case in which a plurality of lane changes are accompanied.

FIGS. 14A to 14F are diagrams illustrating a method for determining a route change for each section according to an embodiment of the present invention. FIGS. 14A to 14F may be obtained by modeling the respective sections of FIG. 13.

In FIGS. 14A to 14F, an arrow indicates the traveling direction of a vehicle, a left box indicates a lane when a vehicle enters a section (entrance time), an arrow facing a box indicates a route when a vehicle enters a section, a right box indicates a lane when a vehicle exits from a section (exit time), and an arrow coming out of a box indicates a route when a vehicle exits from a section. When a box indicating a lane is positioned only at the left side, the box indicates a disappearing lane, and when a box indicating a lane is positioned only at the right side, the box indicates an emerging lane.

A lane at an exit time, corresponding to a lane at an entrance time, may indicate a lane which is connected when a vehicle travels without a lane change, even through the lane at the exit time must disappear or emerge in the middle of the section. When a lane at an entrance time does not correspond to a lane at an exit time, it may indicate that a vehicle can move to another lane through a line change.

'L' represents a lane adjacent to the left side of a route. When a plurality of lanes exist, the lanes may be represented by L1, L2, . . . . Furthermore, 'R' represents a lane adjacent to the right side of a route. When a plurality of lanes exist, the lanes may be represented by R1, R2, . . . .

Figure 14A:
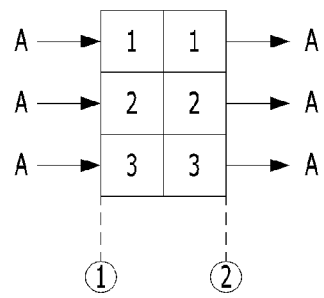
FIGS. 14A to 14F are diagrams illustrating a method for determining a route change for each section according to an embodiment of the present invention.
Figure 14B:
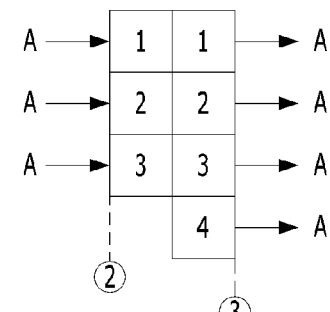
Figure 14C:
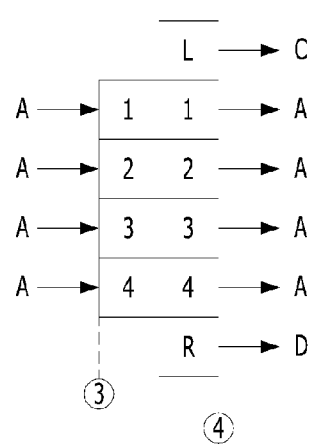
Figure 14D:
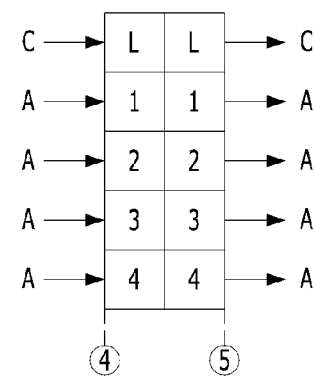
Figure 14E:
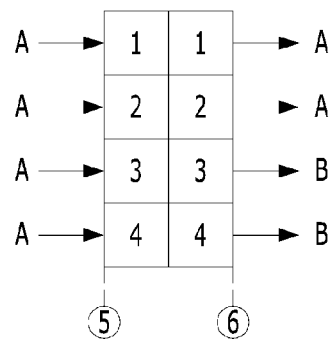
Figure 14F:
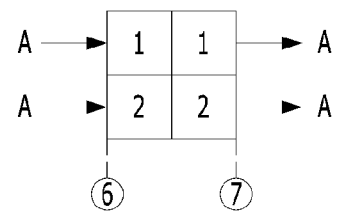

FIG. 14A illustrates a route change impossible section I in which a route cannot be changed because the number of lanes at an entrance time is equal to the number of lanes at an exit time. FIG. 14B illustrates a route change impossible section II in which a route cannot be still changed even though the number of lanes at an exit time is larger than the number of lanes at an entrance time because one lane emerged. FIG. 14C illustrates a route change possible section I in which a route can be changed to a route C at the left side or a route D at the right side. FIG. 14D illustrates a route change possible section II in which a route can be changed to the route C at the left side. FIG. 14E illustrates a route change possible section III in which a route can be changed because the route A is divided into a route A and a route B. FIG. 14F illustrates a route change impossible section III in which a route cannot be changed because the number of lanes at an entrance time is equal to the number of lanes at an exit time.

Figure 15:
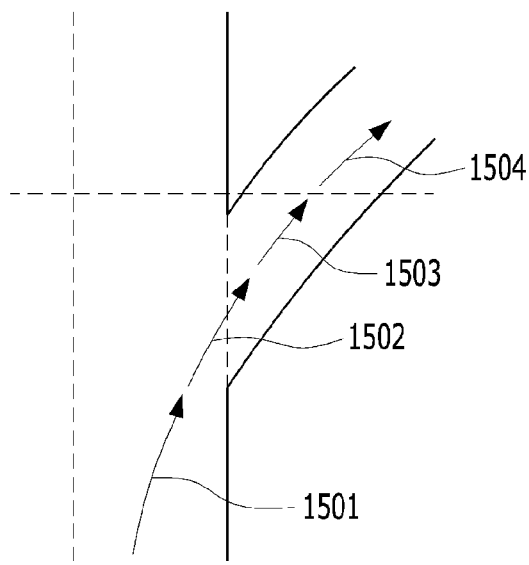
FIG. 15 is a diagram illustrating a state in which a route is changed according to the embodiment of the present invention.

FIG. 15 is a diagram illustrating a state in which a route is changed according to the embodiment of the present invention. According to the current position of a vehicle, it is possible to determine whether a route change is tried, whether a route change is performed, whether a route change is decided, and whether a route change is completed.

That is, the information matching unit 110 within the arithmetic processing module 100 according to the embodiment of the present invention may determine that the vehicle is trying to change the route, when an offset of a route-change line, acquired from the image recognition module 220, decreases at a predetermined rate or more in accordance with time (1501). Then, the information matching unit 110 may determine that a line change for route change is being performed, when the image recognition module 220 recognizes that a part of the vehicle is positioned on the route-change line (1502). Then, the information matching unit 110 may determine that the line change for route change was decided, when the image recognition module 220 recognizes that the entire vehicle deviates from the route-change line (1503). Finally, the information matching unit 110 may determine that the lane change is completed, when it is detected that the vehicle entered a route change impossible section from a route change possible section, based on the image recognized by the image recognition module 220 (1504). The route-change line may indicate a line for entering another route from the route where the vehicle is traveling. For example, the route-change line may include the leftmost or rightmost line or a line which divides the current route.

For example, when it is recognized that a part of the vehicle is positioned on the left route-change line as illustrated in FIG. 14C, the information matching unit 110 may determine that the route is being changed to the route C. The left route-change line may indicate a line between a lane L and the first lane. On the other hand, when it is recognized that a part of the vehicle is positioned on the right route-change line, the information matching unit 110 may determine that the route is being changed to the route D. The right route-change line may indicate a line between the fourth lane and a lane R.

According to another embodiment of the present invention, the information matching unit 110 within the operation processing module 100 may determine that a line change for route change was decided, even when a route at an exit time is predicted because the vehicle did not perform a line change for route change.

Figure 16:
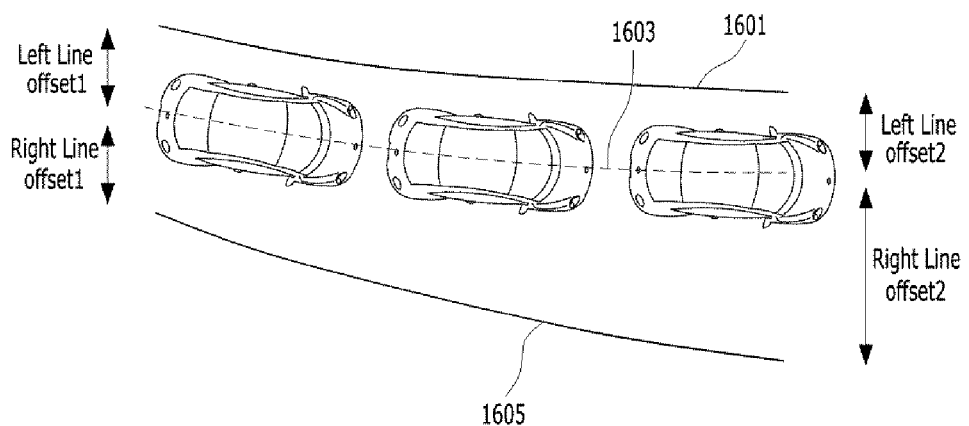
FIG. 16 is a diagram illustrating a method for determining a line change and a route decision through line offset analysis according to another embodiment of the present invention.

FIG. 16 is a diagram illustrating a method for determining a line change and a route decision through line offset analysis according to another embodiment of the present invention. The method can be used when a line is not recognized because the line is partially erased or unclear, or when the corresponding line is a line for deciding a route change.

In the present embodiment, 'line offset analysis' may indicate analyzing a change in left line offset or right line offset, when a vehicle travels. The left or right line offset may indicate a distance from a virtual reference line 1603 in the center of the vehicle to a left or right line 1601 or 1605.

When the vehicle travels along a left line 1601 as illustrated in FIG. 16, an offset of the left line 1601, acquired from the image recognition module 220, may be constantly maintained (left line offset 1=left line offset 2), and an offset of a right line 1605, acquired from the image recognition module 220, may increase (right line offset 1<right line offset 2). In this case, the information matching unit 110 within the arithmetic processing module 100 may determine that the vehicle will travel along a route connected to the left line.

Furthermore, although not illustrated, the offset of the left line 1601, acquired from the image recognition module 220, may decrease (left line offset 1>left line offset 2), and the offset of the right line 1605, acquired from the image recognition module 220, may increase (right line offset 1<right line offset 2). In this case, the information matching unit 110 within the arithmetic processing module 100 may determine that the vehicle will travel along the route connected to the left line.

On the other hand, when the vehicle travels along the left line 1601, the offset of the left line 1601, acquired from the image recognition module 220, may be constantly maintained (left line offset 1=left line offset 2), and the right line may disappear from the image acquired from the image recognition module 220. In this case, the information matching unit 110 within the arithmetic processing module 100 may also determine that the vehicle will travel along the route connected to the left line.

Furthermore, when the vehicle travels along the left line 1601, the offset of the left line 1601, acquired from the image recognition module 220, may decrease (left line offset 1>left line offset 2), and the right line may disappear from the image acquired from the image recognition module 220. In this case, the information matching unit 110 within the arithmetic processing module 100 may also determine that the vehicle will travel along the route connected to the left line.

Conversely, when the vehicle travels along the right line 1605, the offset of the right line 1605, acquired from the image recognition module 220, may be constantly maintained (right line offset 1=right line offset 2), and the offset of the left line 1601, acquired from the image recognition module 220, may increase (left line offset 1<left line offset 2). In this case, the information matching unit 110 within the arithmetic processing module 100 may determine that the vehicle will travel along a route connected to the right line 1605.

Furthermore, when the vehicle travels along the right line 1605, the offset of the right line 1605, acquired from the image recognition module 220, may decrease (right line offset 1>right line offset 2), and the offset of the left line 1601, acquired from the image recognition module 220, may increase (left line offset 1<left line offset 2). In this case, the information matching unit 110 within the arithmetic processing module 100 may determine that the vehicle will travel along a route connected to the right line 1605.

Similarly, when the vehicle travels along the right line 1605, the offset of the right line 1605, acquired from the image recognition module 220, may be constantly maintained (right line offset 1=right line offset 2), and the left line 1601 may disappear from the image acquired from the image recognition module 220. In this case, the information matching unit 110 within the arithmetic processing module 100 may also determine that the vehicle will travel along the route connected to the right line 1605.

Furthermore, when the vehicle travels along the right line 1605, the offset of the right line 1605, acquired from the image recognition module 220, may decrease (right line offset 1>right line offset 2), and the left line 1601 may disappear from the image acquired from the image recognition module 220. In this case, the information matching unit 110 within the arithmetic processing module 10 may also determine that the vehicle will travel along the route connected to the right line 1605.

Figure 17:
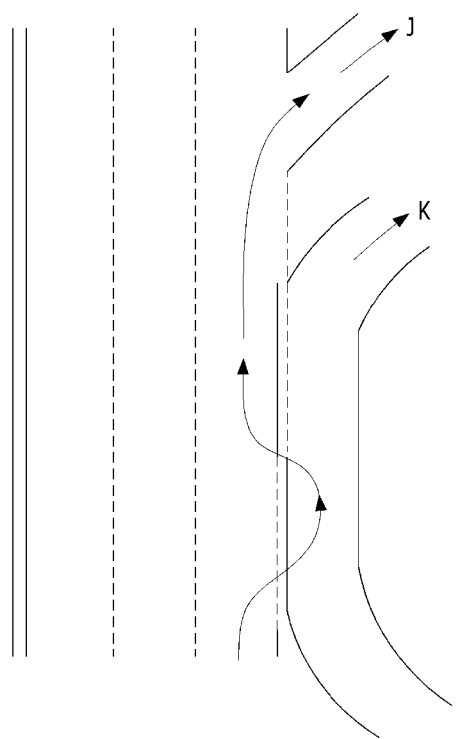
FIG. 17 is a diagram illustrating an example in which a route change of a vehicle is modified according to an embodiment of the present invention.

FIG. 17 is a diagram illustrating an example in which a route change of a vehicle is modified according to an embodiment of the present invention. Referring to FIG. 17, when a driver must enter a route J but enters a route K for mistake, a suitable mention may be provided according to a route change trial step, a route change progress step, or a route change decision step, thereby inducing the driver to enter the route J.

According to the embodiment of the present invention, the arithmetic processing module 100 may announce a voice message saying "Go straight!", for example, through a speaker (not illustrated) connected to the arithmetic processing module 100, at the route change trial step. The line change tracking unit 120 according to the embodiment of the present invention may be applied to the route change trial step through line change tracking. Furthermore, according to another embodiment of the present invention, the line change tracking unit 110 may be applied to the route change trial step through line offset analysis.

According to another embodiment of the present invention, the arithmetic processing module 100 may announce a voice message saying "You are deviating from the route", for example, through the speaker (not illustrated) connected to the arithmetic processing module 100, at the route change progress step. The line change tracking unit 120 according to the embodiment of the present invention may be applied to the route change progress step through line change tracking. Furthermore, according to another embodiment of the present invention, the line change tracking unit 110 may be applied to the route change progress step through line offset analysis.

According to another embodiment of the present invention, the arithmetic processing module 100 may announce "You deviated from the route. Return to the route.", for example, through the speaker (not illustrated) connected to the arithmetic processing module 100, at the route change decision step. Furthermore, according to another embodiment of the present invention, the line change tracking unit 120 may repetitively inform the driver of a lane in which a route change is possible, when the current driving lane does not coincides with the changed lane, through line change tracking. Furthermore, according to another embodiment of the present invention, the information matching unit 110 may repetitively inform the driver of a lane in which a route change is possible, when the current driving lane does not coincides with the changed lane, through line offset analysis.

According to another embodiment of the present invention, the arithmetic processing module 100 may inform the driver of a lane in which a route change is possible, in consideration of the traveling velocity of the vehicle and a distance to a route change impossible section (for example, a dotted line between 1503 and 1504 in FIG. 15), thereby inducing the driver to change the route. For example, when determining that a route change is dangerous because the traveling velocity of the vehicle exceeds a predetermined value in comparison to the number of lanes which the vehicle must change from the current lane in order to change the route, the arithmetic processing module 100 may cancel the current route guide function. Then, the arithmetic processing module 100 may re-search the next route and inform the driver of the next route.

According to another embodiment of the present invention, the arithmetic processing module 100 may inform the driver of a lane in which a route change is possible, in consideration of a distance from the position of the current driving lane of the vehicle to a route change impossible section (for example, the dotted line between 1503 and 1504 in FIG. 15), thereby inducing the driver to change the route. For example, when determining that a route change is dangerous because the number of lanes which the vehicle must change from the current lane is large in comparison to the remaining forward distance from the vehicle to the route change impossible section (for example, the dotted line between 1503 and 1504 in FIG. 15), the arithmetic processing module 100 may cancel the current route guide function. Then, the arithmetic processing module 100 may re-search the next route and inform the driver of the next route The navigation system for determining a route change of a vehicle and the method thereof according to the embodiment of the present invention may match recognition information with line characteristic information (i), and specify a driving lane by tracking a line change (ii). Furthermore, the navigation system and the method thereof may correct a lateral position by calculating an offset for the left line of the driving lane from image recognition information (iii), and estimate a longitudinal position by calculating a head angle from the image recognition information, thereby specifying the lateral position and the longitudinal direction with more precision (iv). Thus, the navigation system and the method may determine the change of the driving route, and determine the change of the driving route using line information, image recognition information, and information for each section, which are interconnected to the GPS device.

According to the embodiments of the present invention, the navigation system can extract high-precision position information like a high-precision DGPS device, while using a low-precision GPS device, thereby determining a change of a travel route. Furthermore, the navigation system can determine the change of the travel route using line information, image recognition information, and information for each section, which are interconnected to the GPS device.

Furthermore, the navigation system may accurately calculate a driving lane by matching the line recognition information and the information for each section, which are extracted through the image recognition module, with line characteristic information which is previously stored or received, thereby precisely correcting position information acquired through the GPS device. Thus, without using an expensive DGPS device, the navigation system may determine a change of the travel route, thereby obtaining high-precision position information.

While various embodiments have been described above, it will be understood to those skilled in the art that the embodiments described are by way of example only. Accordingly, the disclosure described herein should not be limited based on the described embodiments.

What is claimed is:

1. A navigation system comprising:
   a GPS module;
   an image recognition module having a line recognition function;
   a roadmap storage module configured to store roadmap information and route change possible section information through which a route of a vehicle is changed;
   a roadmap receiving module configured to receive the roadmap information; and
   an arithmetic processing module configured to determine whether the route of the vehicle is changed, based on the route change possible section information and line recognition information recognized by the image recognition module,
   wherein the roadmap information stored in the roadmap storage module comprises line characteristic information, and
   wherein when determining that a route change is dangerous because a number of lanes which are to be changed from a current lane of the vehicle is large in comparison to a remaining forward distance to a route change impossible section from the vehicle, the arithmetic processing module cancels a current route guide function and searches for a next route.

2. The navigation module of claim 1, wherein the roadmap information stored in the roadmap storage module comprises line characteristic information,
   wherein the arithmetic processing module comprises an information matching unit configured to calculate a driving lane by matching the line recognition information with the line characteristic information, and
   the information matching unit determines whether the vehicle tries to change the route, through line offset analysis.

3. The navigation module of claim 1, wherein the roadmap information stored in the roadmap storage module comprises line characteristic information,
   wherein the arithmetic processing module comprises:
   an information matching unit configured to calculate a driving lane by matching the line recognition information with the line characteristic information; and
   a line change tracking unit configured to calculate a driving lane by tracking a line change history of the vehicle, and
   the line change tracking unit determines whether the vehicle tries to change the route, through line change tracking.

4. The navigation module of claim 1, wherein the roadmap information stored in the roadmap storage module comprises line characteristic information,
   wherein the arithmetic processing module comprises an information matching unit configured to calculate a driving lane by matching the line recognition information with the line characteristic information, and
   the information matching unit determines whether a line change for route change is performed, through line offset analysis.

5. The navigation module of claim 1, wherein the roadmap information stored in the roadmap storage module comprises line characteristic information,
   wherein the arithmetic processing module comprises:
   an information matching unit configured to calculate a driving lane by matching the line recognition information with the line characteristic information; and
   a line change tracking unit configured to calculate a driving lane by tracking a line change history of the vehicle, and
   the line change tracking unit determines whether a line change for route change is performed, through line change tracking.

6. The navigation module of claim 1, wherein the roadmap information stored in the roadmap storage module comprises line characteristic information,
   wherein the arithmetic processing module comprises an information matching unit configured to calculate a driving lane by matching the line recognition information and the line characteristic information, and
   the information matching unit determines that a line change for route change was decided, through line offset analysis.

7. The navigation module of claim 1, wherein the arithmetic processing module comprises:
   an information matching unit configured to calculate a driving lane by matching the line recognition information with the line characteristic information; and
   a line change tracking unit configured to calculate a driving lane by tracking a line change history of the vehicle, and
   the line change tracking unit determines that a line change for route change was decided, through line change tracking.

8. The navigation module of claim 1, wherein the roadmap information stored in the roadmap storage module comprises line characteristic information,
   wherein when a traveling velocity of the vehicle exceeds a predetermined value in comparison to the number of lanes which are to be changed from the current lane of the vehicle, the arithmetic processing module cancels the current route guide function and searches for the next route.

9. The navigation module of claim 1, wherein when a left line offset acquired through the image recognition module is constantly maintained or decreases and a right line offset acquired through the image recognition module increases, the arithmetic processing module determines that the vehicle will travel along a route connected to the left line.

10. The navigation module of claim 1, wherein when a left line offset acquired through the image recognition module is constantly maintained or decreases and a right line disappears from an image acquired through the image recognition module, the arithmetic processing module determines that the vehicle will travel along a route connected to the left line.

11. The navigation module of claim 1, wherein when a right line offset acquired through the image recognition module is constantly maintained or decreases and a left line offset acquired through the image recognition module increases, the arithmetic processing module determines that the vehicle will travel along a route connected to the right line.

12. The navigation module of claim 1, wherein when a right line offset acquired through the image recognition module is constantly maintained or decreases and a left line disappears from an image acquired through the image recognition module, the arithmetic processing module determines that the vehicle will travel along a route connected to the right line.

13. The navigation module of claim 1, wherein the roadmap information stored in the roadmap storage module comprises line characteristic information, the arithmetic processing module comprises an information matching unit configured to calculate a driving lane by matching the line recognition information with the line characteristic information, the information matching unit performs a route change trial process of determining that the vehicle is trying to change the route, when an offset of a route-change line, acquired through the image recognition module, decreases at a predetermined rate or more in accordance with time, or a route change progress process of determining that a line change for route change is being performed, when the image recognition module recognizes that a part of the vehicle is positioned on the route-change line, and at the route change trail process or the route change progress process, a mention is provided to guide a driver of the vehicle to modify the route.

14. The navigation system of claim 2, wherein the arithmetic processing module further comprises a lateral position correction unit configured to correct a lateral position by calculating an offset for a left line of the current driving lane from the image recognition information.

15. The navigation module of claim 14, wherein the lateral position correction unit corrects the lateral position by adding the offset and the sum of widths of left lanes included in the line characteristic information.

16. The navigation module of claim 15, wherein the arithmetic processing module further comprising a longitudinal position estimation unit configured to estimate a longitudinal position by calculating a head angle between a line and the traveling direction of the vehicle from the image recognition information, when a received signal of a GPS module is cut off.

17. The navigation module of claim 16, wherein the longitudinal position estimation unit follows the following equation:

$$LP = \Delta t \times v \times \cos \theta,$$

wherein LP represents the longitudinal position of the vehicle, $\Delta t$ represents a time change, $v$ represents the velocity of the vehicle, and $\theta$ represents the head angle between the line and the traveling direction of the vehicle.

18. The navigation system of claim 3, wherein the arithmetic processing module further comprises a lateral position correction unit configured to correct a lateral position by calculating an offset for a left line of the current driving lane from the image recognition information.

19. The navigation system of claim 4, wherein the arithmetic processing module further comprises a lateral position correction unit configured to correct a lateral position by calculating an offset for a left line of the current driving lane from the image recognition information.

* * * * *